(12) United States Patent
Chen et al.

(10) Patent No.: US 8,196,991 B2
(45) Date of Patent: Jun. 12, 2012

(54) PAD FOR USE UNDER A COVERING LAYER

(75) Inventors: Debby S. Chen, Ypsilanti, MI (US);
Craig Robert Roper, Evansville, IN (US); George David Brazelton, Evansville, IN (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 324 days.

(21) Appl. No.: 12/497,958

(22) Filed: Jul. 6, 2009

(65) Prior Publication Data
US 2011/0000614 A1 Jan. 6, 2011

(51) Int. Cl.
*B60N 3/04* (2006.01)
*B60R 13/01* (2006.01)

(52) U.S. Cl. .................................... 296/97.23; 428/33
(58) Field of Classification Search ............... 296/97.23; 428/33
See application file for complete search history.

(56) References Cited

U.S. PATENT DOCUMENTS

| | | | |
|---|---|---|---|
| 3,857,749 A * | 12/1974 | Yoshida | 428/80 |
| 5,481,841 A | 1/1996 | Osborn | |
| 5,601,676 A | 2/1997 | Zimmerman et al. | |
| 5,749,993 A * | 5/1998 | Denney et al. | 156/214 |
| 6,522,265 B1 * | 2/2003 | Hillman et al. | 340/988 |
| 6,910,222 B1 | 6/2005 | Schssler | |
| 2007/0042828 A1 | 2/2007 | Krushke et al. | |

OTHER PUBLICATIONS

Buicks.net Sewn Carpet Installation, www.buicks.net/shop/reference/carpet.html, as existed on Jan. 14, 2002, PDF of the webpage on that date provided through Internet Archive Wayback Machine, http://wayback.archive.org/web/.*
Puzzle Floor Premium Quality Hardwood Flooring; http://www.puzzlefloor.com/classic.php; p. 1-4.
Flor is out; Puzzle Carpet is in; http://www.curbly.com/DIY-Maven/posts/1335-flor-is-out-puzzle-carpet-is-in; p. 1-3.

* cited by examiner

*Primary Examiner* — Dennis Pedder
*Assistant Examiner* — Jason S Daniels
(74) *Attorney, Agent, or Firm* — Gifford, Krass, Sprinkle, Anderson & Citkowski, P.C.

(57) ABSTRACT

The present invention discloses a pad for use under a covering layer. The pad can include a mat with at least one off-all portion, the at least one off-all portion having a puzzle-piece shape. The mat has a bounding portion that is complementary shaped with at least part of the at least one off-all portion, and the bounding portion and the off-all portion have an interference fit therebetween. The interference fit between the bounding portion and the at least one off-all portion provides for the off-all portion to be removably attached to the mat. In addition, removal of the at least one off-all portion from the mat provides an opening for a component to be nested therewithin, while not removing the at least one off-all portion provides structural support to the covering layer that is located over the mat.

10 Claims, 2 Drawing Sheets

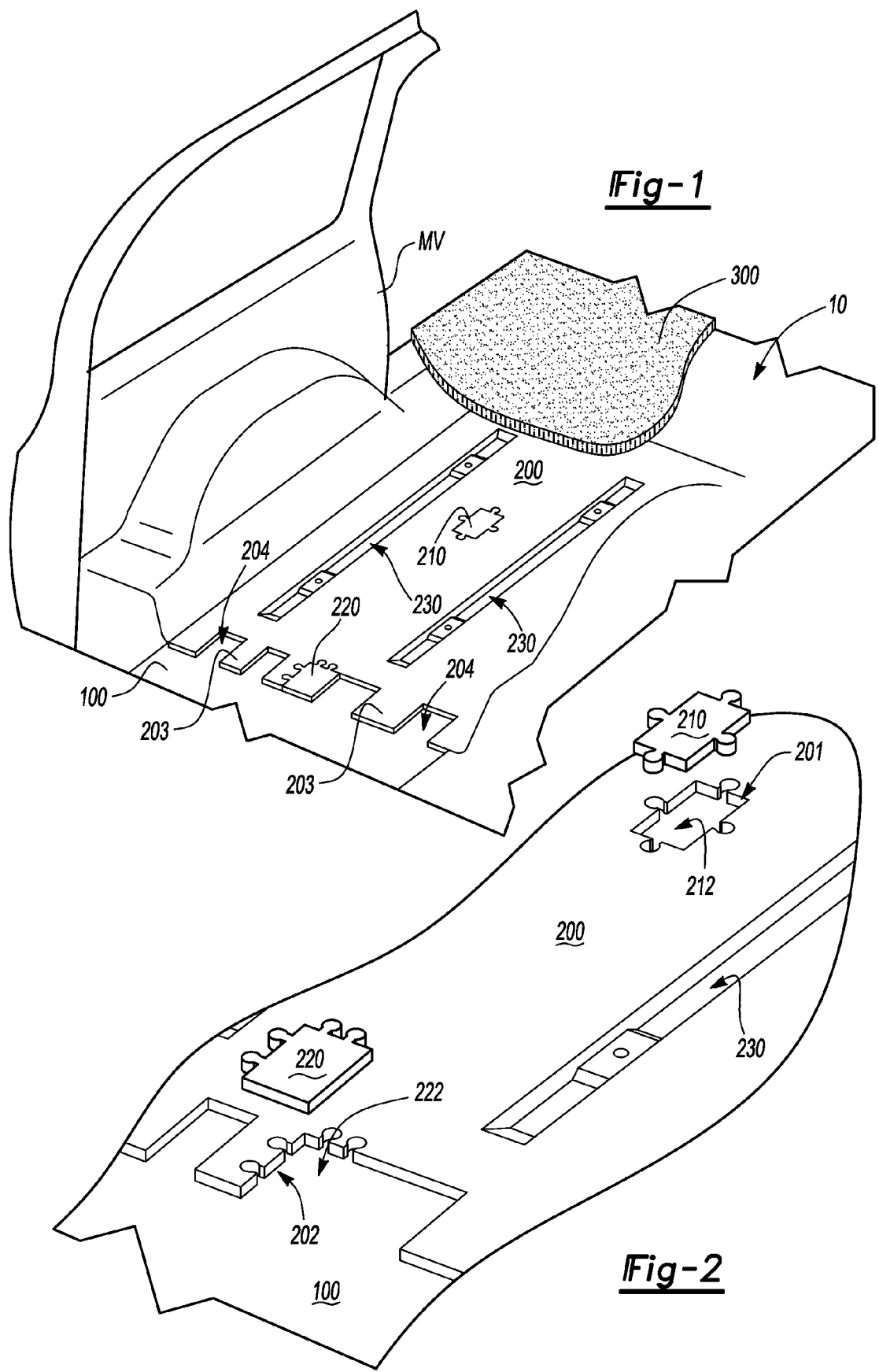

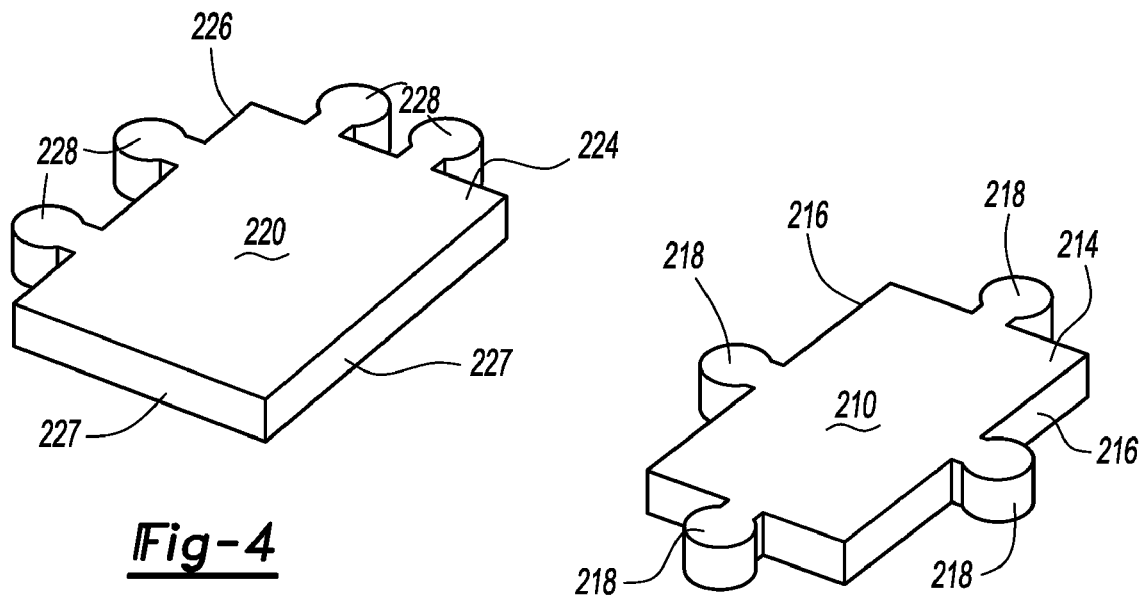
Fig-4
Fig-3
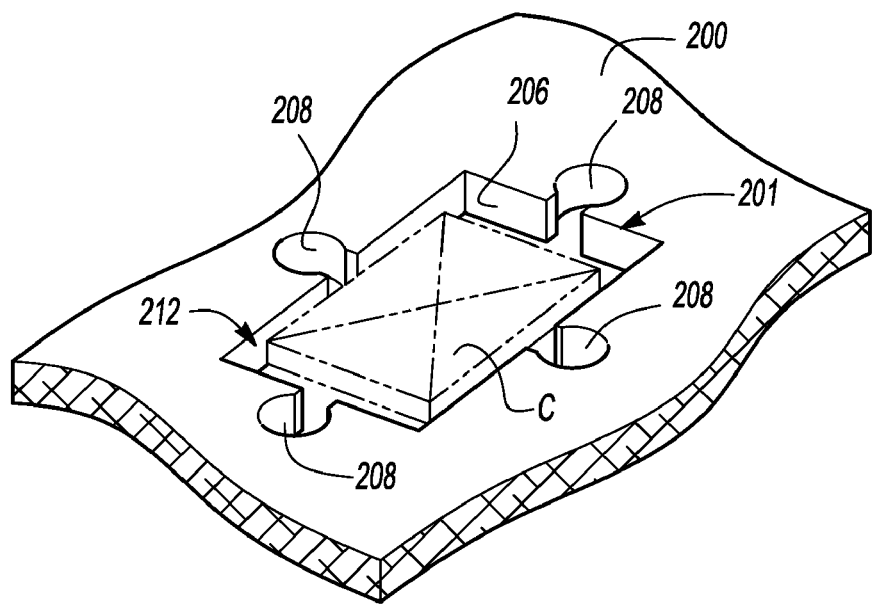
Fig-5

PAD FOR USE UNDER A COVERING LAYER

FIELD OF THE INVENTION

The present invention relates generally to a pad for use under a covering layer, and in particular, to a pad that has an off-all portion with a puzzle-piece shape.

BACKGROUND OF THE INVENTION

The use of pads or mats under a covering layer is known. For example, a covering layer, such as a carpet, typically has a pad or mat between itself and the floor in order to provide a cushioned layer therebetween. In this manner, the mat or pad can provide a relatively inexpensive layer of material that provides shock-absorbing properties and/or a level smooth surface for the carpet to be placed thereon. In the event that a surface has a component extending therefrom, the pad can have an opening cut therein such that the component is nested within the opening and yet still be covered by the covering layer.

In some instances, a floor of a motor vehicle can be carpeted. In the event that a component is mounted to and/or extends from the floor and has a height or thickness not significantly greater or less than the thickness of a carpet pad, the carpet pad can have an opening where the component is nested therewithin and thereby allow for the component to covered by the carpet and still provide an aesthetically pleasing smooth surface.

During assembly line production of machines, for example motor vehicles, reduction of the total number of parts used to manufacture the machine is desired. However, some machines on a given assembly line may have a particular component extending from a body portion of the machine, while other machines on the same assembly line may not have the component extending from the body portion.

In the event that a pad having an opening for the component is installed in a machine that lacks the component, a void or open space is present beneath the covering layer at the opening location. The void or open space may or may not be of functional significance to the machine, but it can result in insufficient structural support to the overlying covering layer and cause an unsightly and/or unsafe depression at this location.

As such, heretofor pads have required one pad having a given part number be provided for machines with the component extending from the body portion and a different pad with a different part number be provided for machines not having the component. This requirement has further resulted in the manufacture, shipment, storage and installation of two separate sets of pads. Therefore, a pad for use under a covering layer that can be used when a component extends from a body portion and when a component is not included, and yet provides structural support for an overlying layer, would be desirable.

SUMMARY OF THE INVENTION

The present invention discloses a pad for use under a covering layer. The pad can include a mat with at least one off-all portion, the at least one off-all portion having a puzzle-piece shape. The mat has a bounding portion that is complementary shaped with at least part of the at least one off-all portion, and the bounding portion and the off-all portion have an interference fit therebetween. The interference fit between the bounding portion and the at least one off-all portion provides for the off-all portion to be removably attached to the mat. In addition, removal of the at least one off-all portion from the mat provides an opening for a component to be nested therewithin, while not removing the at least one off-all portion provides structural support to the covering layer that is located over the mat.

The mat can be an underpad located between a layer of carpet and a body portion of a motor vehicle, and in some instances, the mat is an underpad that is located between the layer of carpet and a floor body portion of the motor vehicle. The at least one off-all portion can be part of an outer edge portion of the mat, or in the alternative the off-all portion can provide a puzzle-piece shaped opening within the mat. The mat can be made from a polymer, and in some instances is made from a polymer fiber such as polyethylene terephthalate.

A process for installing carpet in a motor vehicle is also disclosed. The process includes providing a mat with at least one off-all portion, the at least one off-all portion having a puzzle-piece shape and the mat having a bounding portion complementary in shape with at least part of the at least one off-all portion. The bounding portion and the at least one off-all portion have an interference fit therebetween such that the at least one off-all portion is removably attached to the mat. A layer of carpet can also be provided along with a body portion of a motor vehicle to be covered with the layer of carpet.

The process also includes determining if a desired component is extending from the body portion of the motor vehicle at a predetermined location. Thereafter, the process includes removing the at least one off-all portion from the mat if the component is extending from the body portion and leaving the at least one off-all portion removably attached to the mat if the desired component is not extending from the body portion. Thereafter, the mat is extended over the body portion to be covered with the layer of carpet and then the layer of carpet is extended across the mat. In this manner, if the at least one off-all portion is removed from the mat, then the component can be nested within the bounding portion, and if the at least one off-all portion is not removed from the mat, then the at least one off-all portion can provide structural support to the layer of carpet. The component can be a smart sensor that extends from the body portion of the motor vehicle; and in some instances, the smart sensor is a smart key sensor.

BRIEF DESCRIPTION OF THE DRAWINGS

FIG. 1 is a perspective view of a pad according to an embodiment of the present invention;

FIG. 2 is an exploded view of a portion of the pad shown in FIG. 1;

FIG. 3 is a perspective view of an off-all portion having a puzzle-piece shape;

FIG. 4 is a perspective view of another off-all portion having a puzzle-piece shape; and FIG. 5 is a perspective view of a component nested within an opening of the pad.

DETAILED DESCRIPTION OF THE PRESENT INVENTION

The present invention discloses a pad for use under a covering layer. As such, the present invention has utility as a cushioning layer.

The pad can include a mat with at least one off-all portion, the off-all portion having a puzzle-piece shape. For the purposes of the present invention, the term "off-all portion" is defined as a scrap portion of the mat that can be removed from the mat with a pulling action and discarded. The mat has a bounding portion that is complementary shaped with at least part of the at least one off-all portion, the bounding portion and the at least one off-all portion having an interference fit therebetween such that the at least one off-all portion is removably attached to the mat. In this manner, the at least one off-all portion can be removed from the mat and provide an opening for a component to be nested therewithin; or in the alternative, the at least one off-all portion can be left removably attached to the mat, thereby providing structural support to the covering layer that extends across the mat. The use of at least one off-all portion can result in a single mat being installed to cover a surface whether or not the surface has a component extending therefrom. For example and for illustrative purposes only, during the assembly of a motor vehicle, a single mat can be used whether or not a particular motor vehicle has a smart sensor attached to and/or extending from a body portion that is to be covered with carpet.

In some instances, the mat can be an underpad located between a layer of carpet and a body portion of a motor vehicle. In addition, the at least one off-all portion can form or make an outer edge portion of the mat.

A process for installing carpet in a motor vehicle is also disclosed, the process including a mat as described above. In addition, the process includes providing a layer of carpet and providing a body portion of a motor vehicle to be covered with the layer of carpet. After the body portion of the motor vehicle has been provided, the process includes determining if a desired component is extending from the body portion at a predetermined location. Thereafter, the at least one off-all portion can be removed from the mat if the component is extending from the body portion and the at least one off-all portion can be left removably attached to the mat if the desired component is not extending from the body portion. Once the at least one off-all portion has been removed, or not removed, the mat can be extended over the body portion to be covered with the layer of carpet and the layer of carpet can be extended across the mat. In this manner, a process is disclosed that allows for a component to be nested within the bounding portion of the mat, assuming the component is present, or the at least one off-all portion can provide support to the layer of carpet, assuming the component is not present. As such, a single mat can be provided for at least two different assembly scenarios, the single mat reducing the number of components to be manufactured and provided for the assembly of a machine. It is appreciated that the single mat can have a single part number and can reduce the complexity of the design of a machine, the logistics of assembling the machine and the like.

Turning now to FIGS. 1-5, an embodiment of a pad is shown generally at reference numeral 10. The pad 200 can be used to extend across a surface 100, the surface 100 in some instances being a floor surface for a motor vehicle MV. The pad 200 can have at least one off-all portion 210, the off-all portion 210 having a puzzle-piece shape. In some instances, an off-all portion 220 can be provided and the mat 200 can have one or more additional openings 230 that afford for the attachment of seating components, freight attachment components and the like. The removal of the off-all portion 210 can provide an opening 212 in the mat 200, the opening 212 having a bounding portion 201. It is appreciated that the off-all portion 210 is puzzle-piece shaped and can have one or more tabs 218 extending from a body 214. The body 214 can have an outer edge 216 from which the tabs 218 extend therefrom. In some instances, the off-all portion 210 and the bounding portion 201 are complementary in shape and have an interference fit therebetween. The interference fit affords for the off-all portion 210 to remain removably attached to the mat 200 until removed by a pulling and/or pushing action.

As shown in FIGS. 2 and 3, the off-all portion 220 can form an outer edge portion of the mat 200. As such, the outer edge portion of the mat 200 can be void of tabs 228 which are present on edges 226 of the off-all portion 220. However, it is appreciated that the off-all portion 220 and the bounding portion of the mat 200 that is complementary shaped with the tabs 228 provide an interference fit that affords for removable attachment of the off-all portion 220 to the mat 200. As such, an off-all portion can be located within the mat 200 or along an outer edge. In addition, it is appreciated that FIGS. 1-3 teach that the mat 200 can have a first configuration when the off-all portion(s) 210 and/or 220 are/is in position and mounted within the bounding portion(s) 201 and/or 202, respectively, and a second configuration when the off-all portion(s) 210 and/or 220 are/is removed from the bounding portion(s) 201 and/or 202, respectively, and thereby provide the opening(s) or void(s) 212 and/or 222, respectively.

Turning now to FIG. 5, an example of a component C extending from the body portion 100 is shown. It is appreciated that the component C is nested within the bounding portion 201 and/or opening 212 of the mat 200. It is further appreciated that the component C, or a separate component (not shown), can extend from the floor portion 100 at a location of the off-all portion 220 if not removed from the mat 200. In this manner, one or more components can be accommodated for by the mat 200 by simply removing the off-all portion 210, the off-all portion 220, and the like. In the alternative, by not removing the off-all portion 210, the off-all portion 220, etc., structural support is provided to a covering layer 300, thereby not resulting in a cavity in the mat 200 which could be stepped on, cargo could be placed on and the like.

In some instances, the mat 200 can be made from a polymer and may or may not be made from a polymer fiber. For example and for illustrative purposes only, the mat 200 can be made from a polyethylene terephthalate fiber.

In view of the teaching presented herein, it is to be understood that numerous modifications and variations of the embodiments disclosed will be readily apparent to those of skill in the art. Likewise, the exact shape, composition and the like of the mat, off-all portions and the like can be altered without extending beyond the scope of the invention. The foregoing is illustrative of specific embodiments of the invention, but is not meant to be a limitation upon the practice thereof. It is the following claims, including all equivalents, which define the scope of the invention.

We claim:

1. A motor vehicle floor with a mat and a covering layer for covering at least one component, said motor vehicle floor comprising:

a floor having a top surface and a component extending above said top surface;

a mat extending over said floor top surface and a covering layer extending over said mat and said component;

said mat having a first configuration with at least one off-all portion in position and mounted within a bounding portion and located between said floor top surface and said covering layer, said mat also having a second configuration with said at least one off-all portion removed from said bounding portion and said bounding portion forming a void;

said at least one off-all portion having a puzzle-piece shape and said bounding portion having a complementary shape to provide an interference fit between said at least one off-all portion and said bounding portion;

said mat substantially covering said top surface with said void positioned to receive said component and said component nested within said void when said mat is in said second configuration;

said at least one off-all portion providing structural support to said covering layer when said mat is in said first configuration; and said mat in said second configuration providing a void for said component to be nested therewithin.

2. The motor vehicle floor of claim 1, wherein said mat is an underpad extending over a floor surface and said covering layer is a layer of carpet.

3. The motor vehicle floor of claim 1, wherein one of said at least one off-all portion is an outer edge portion of said mat.

4. The motor vehicle floor of claim 1, wherein said bounding portion of said mat is a puzzle-piece shaped opening.

5. The motor vehicle floor of claim 1, wherein said mat is made from a polymer.

6. The motor vehicle floor of claim 5, wherein said mat is made from a polymer fiber.

7. The motor vehicle floor of claim 6, wherein said polymer fiber is a polyethylene terephthalate fiber.

8. A process for installing carpet over a motor vehicle floor, the process comprising:

providing a motor vehicle with a floor and a component extending above the floor;

providing a mat to be installed within the motor vehicle onto the floor, the mat having a first configuration with at least one off-all portion in position and mounted within a bounding portion, the mat also having a second configuration with the at least one off-all portion removed from the bounding portion and the bounding portion forming a void, the at least one off-all portion having a puzzle-piece shape and the bounding portion complementary in shape with the at least one off-all portion and providing an interference fit with the at least one off-all portion such that the at least one off-all portion is removably attached to the mat;

providing a layer of carpet to cover the mat;

determining if the component is extending above the floor of the motor vehicle at a location that will nest within the void when the mat is installed on the floor;

determining if the mat should be in the first configuration or the second configuration based on the location of the component;

removing the at least one off-all portion from the mat if the mat should be in the second configuration;

extending the mat over the floor to be covered with the layer of carpet; and extending the layer of carpet over the mat and over the component, the at least one off-all portion providing structural support to the covering layer if the mat is in the first configuration and the mat providing a void for the component to be nested therewithin if the mat is in the second configuration.

9. The process of claim 8, wherein the component is a smart sensor extending from floor surface of the motor vehicle.

10. The process of claim 8, wherein the at least one off-all portion removably attached to the mat is an outer edge portion of the mat.

* * * * *